(12) United States Patent
Graumann et al.

(10) Patent No.: US 10,764,563 B2
(45) Date of Patent: Sep. 1, 2020

(54) 3D ENHANCED IMAGE CORRECTION

(71) Applicant: Intel Corporation, Santa Clara, CA (US)

(72) Inventors: David L. Graumann, Portland, OR (US); Rahuldeva Ghosh, Portland, OR (US); Scott Pfursich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 14/664,475

(22) Filed: Mar. 20, 2015

(65) Prior Publication Data

US 2016/0142702 A1    May 19, 2016

Related U.S. Application Data

(60) Provisional application No. 62/079,086, filed on Nov. 13, 2014.

(51) Int. Cl.
*H04N 13/293*    (2018.01)
*G06K 9/00*    (2006.01)
(Continued)

(52) U.S. Cl.
CPC ....... *H04N 13/293* (2018.05); *G06K 9/00201* (2013.01); *G06K 9/00288* (2013.01); *G06K 9/46* (2013.01); *G06K 9/4604* (2013.01); *G06T 5/006* (2013.01); *G06T 7/11* (2017.01); *H04N 5/235* (2013.01); *H04N 5/2351* (2013.01);
(Continued)

(58) Field of Classification Search
USPC .......................................................... 348/47
See application file for complete search history.

(56) References Cited

U.S. PATENT DOCUMENTS

| | | | |
|---|---|---|---|
| 8,300,890 B1 * | 10/2012 | Gaikwad | G06K 9/00771 382/103 |
| 2002/0176010 A1 * | 11/2002 | Wallach | H04N 5/235 348/229.1 |

(Continued)

FOREIGN PATENT DOCUMENTS

| | | |
|---|---|---|
| CN | 1611064 A | 4/2005 |
| CN | 102576456 A | 7/2012 |

(Continued)

OTHER PUBLICATIONS

"International Application Serial No. PCT/US2015/060351, International Preliminary Report on Patentability dated May 26, 2017", 6 pgs.

(Continued)

*Primary Examiner* — Christopher S Kelley
*Assistant Examiner* — Ana Picon-Feliciano
(74) *Attorney, Agent, or Firm* — Schwegman, Lundberg & Woessner, P.A.

(57) ABSTRACT

A user authentication system and method. A two-dimensional image of a scene is obtained and range information obtained from the scene is aligned with the two-dimensional image. One or more depth regions is identified and image segments corresponding to the one or more depth regions are selected within the two-dimensional image. Brightness operations are performed on one or more of the selected image segments to form a corrected image.

23 Claims, 5 Drawing Sheets

(51) Int. Cl.
  *G06T 7/11* (2017.01)
  *H04N 5/235* (2006.01)
  *H04N 13/271* (2018.01)
  *G06K 9/46* (2006.01)
  *G06T 5/00* (2006.01)
  *H04N 13/00* (2018.01)

(52) U.S. Cl.
  CPC ... *H04N 13/271* (2018.05); *G06K 2009/4666* (2013.01); *G06T 2207/10004* (2013.01); *G06T 2207/10024* (2013.01); *G06T 2207/10028* (2013.01); *G06T 2207/20012* (2013.01); *G06T 2207/30201* (2013.01); *H04N 2013/0092* (2013.01); *H04N 2213/003* (2013.01)

(56) References Cited

U.S. PATENT DOCUMENTS

| | | | |
|---|---|---|---|
| 2003/0001117 A1* | 1/2003 | Hyun | G01B 11/00 250/559.19 |
| 2007/0091085 A1 | 4/2007 | Wang et al. | |
| 2007/0296835 A1* | 12/2007 | Olsen | H01L 27/14652 348/234 |
| 2011/0026051 A1* | 2/2011 | Wang | G06T 5/50 358/1.9 |
| 2011/0043610 A1 | 2/2011 | Ren et al. | |
| 2011/0129118 A1* | 6/2011 | Hagbi | G06T 19/006 382/103 |
| 2012/0050483 A1* | 3/2012 | Boross | H04N 13/0018 348/46 |
| 2013/0086674 A1 | 4/2013 | Horvitz et al. | |
| 2013/0223696 A1* | 8/2013 | Azar | G06K 9/00892 382/118 |
| 2016/0086017 A1* | 3/2016 | Rodriguez | G06K 9/00288 382/118 |

FOREIGN PATENT DOCUMENTS

| | | |
|---|---|---|
| CN | 103593594 A | 2/2014 |
| JP | 2014016792 A | 1/2014 |
| WO | WO-2016077568 A1 | 5/2016 |

OTHER PUBLICATIONS

"International Application Serial No. PCT/US2015/060351, International Search Report dated Mar. 11, 2016", 3 pgs.

"International Application Serial No. PCT/US2015/060351, Written Opinion dated Mar. 11, 2016", 4 pgs.

"European Application Serial No. 15858522.4, Extended European Search Report dated May 18, 2018", 8 pgs.

"European Application Serial No. 15858522.4, Response filed Dec. 11, 2018 to Extended European Search Report dated May 18, 2018", 15 pgs.

"European Application Serial No. 15858522.4, Communication Pursuant to Article 94(3) EPC dated Apr. 11, 2019", 5 pgs.

"Chinese Application Serial No. 201580058480.X, Office Action dated Sep. 30, 2019", w/English translation, 22 pgs.

"European Application Serial No. 15858522.4, Response filed Aug. 6, 2019 to Communication Pursuant to Article 94(3) EPC dated Apr. 11, 2019", 12 pgs.

"Chinese Application Serial No. 201580058480.X, Response filed Feb. 16, 2020 to Office Action dated Sep. 30, 2019", w/ English claims, 9 pgs.

"Chinese Application Serial No. 201580058480.X, Office Action dated Jun. 8, 2020", w English Translation, 9 pgs.

* cited by examiner

3D ENHANCED IMAGE CORRECTION

RELATED APPLICATIONS

This application claims the benefit of priority to U.S. Provisional Application Ser. No. 62/079,086, filed Nov. 13, 2014, which is incorporated herein by reference in its entirety.

BACKGROUND

Identification of human faces using either near infrared or visible light is becoming common place for augmented reality applications, biometric identification, surveillance, and more. One major limitation to using camera images for identification is the need for homogenous and ample lighting conditions. When the lighting of the face is coming from a single direction (such as a side lamp), however, the ability to see the geometric and biometric features is compromised and renders identification less effective. A common method to manage this case is to alter the camera's gain, exposure, or gamma levels to brighten or sharpen the dimly lit sections of the image or darken the washed out sections of the image. These methods do not work when half the face is bright and the other half is dark. In that case, a face is often not detected at all rendering the identification process useless.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As noted above, one major limitation to using camera images for identification is the need for homogenous and ample lighting conditions. When the lighting of the face is coming from a single direction (such as via a side lamp), however, the ability to see the geometric and biometric features is compromised, making the identification process less effective.

Figure 1:
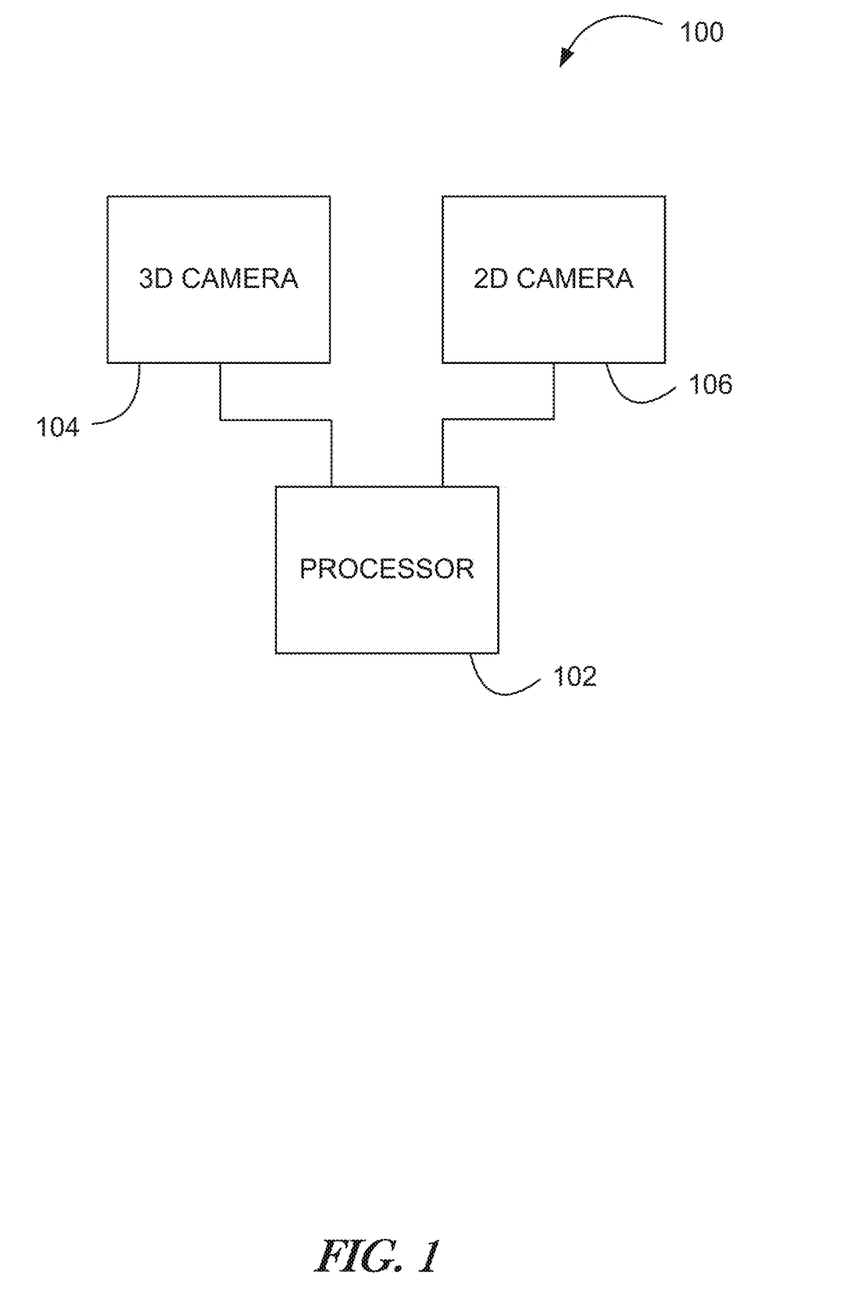
FIG. 1 illustrates a system for identifying human faces.

A system for identifying human faces is shown in FIG. 1. In the example embodiment shown in FIG. 1, a processor 102 is connected to a 3D camera 104 and a 2D camera 106. In the embodiment shown in FIG. 1, 3D camera 104 captures range information in a scene while 2D camera 106 (infrared, visible or other light) captures image data. Processor 102 receives the range information from the 3D camera 104 and the image data from the 2D 106 camera and uses the range information to determine regions of interest in the image.

In an embodiment, 3D camera 104 isolates all regions of interest in the camera scene that require independent gain/exposure control using a depth surface analysis. This is performed prior to the search for a face in the scene. By doing so, a single camera image can provide a better face image to the face recognizer and face identifier in those lighting conditions. This allows for cameras 104 and 106 to find poorly lit faces under a broader range of real world conditions.

In some such embodiments, the analysis to isolate regions of interest in the camera scene is performed by processor 102. In other embodiments, some or all of the analysis is performed by a processor in 3D camera 104. In other embodiments, other processors, such as across a network or in the cloud, perform some or all of the analysis.

Figure 2:
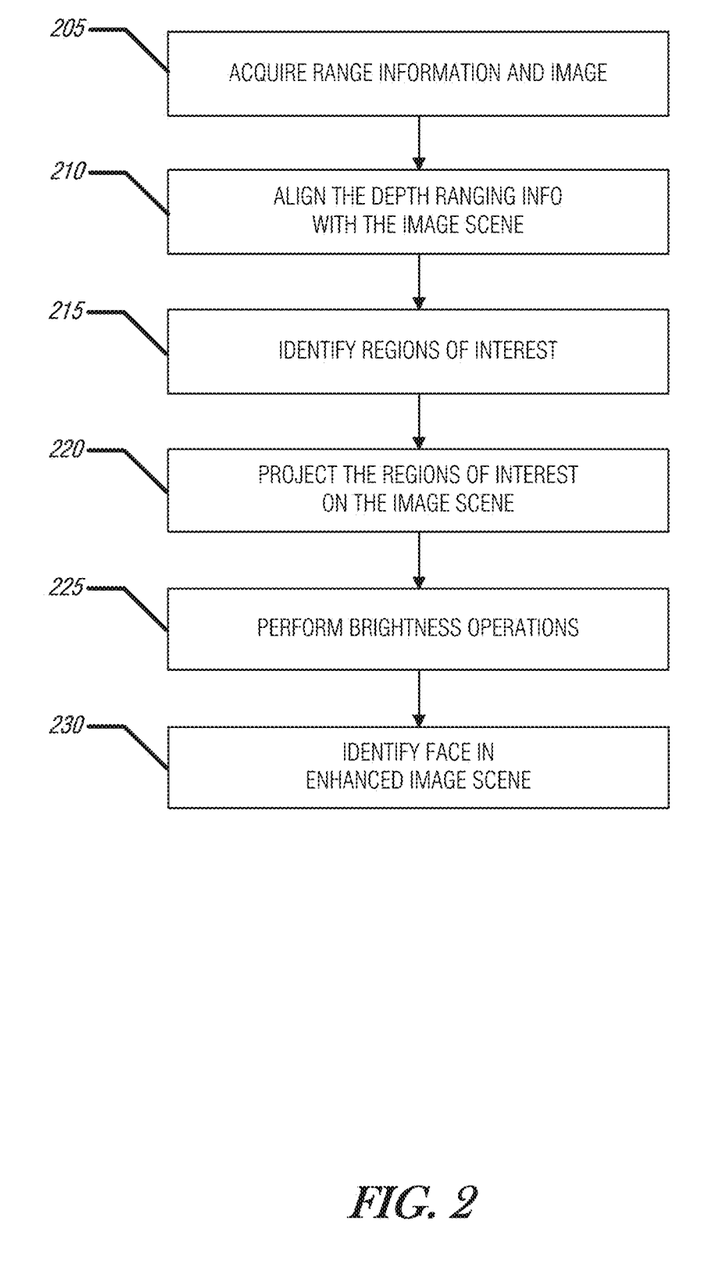
FIG. 2 illustrates a method of 3D lighting compensation.

An example embodiment of a method for 3D lighting compensation is shown in FIG. 2. In the example embodiment of FIG. 2, at 205, a scene is captured by 3D camera 104 and 2D camera 106 at approximately the same time. In one example embodiment, range information is captured by 3D camera 104 and a visible light image (e.g. RGB) is captured by 2D camera 106. The range information is aligned at 210 to the visible light image. In some embodiments, the range information is converted to a real-world Cartesian coordinate system before being aligned to the 2D image at 210.

At 215, the method identifies regions of interest in the scene captured by 3D camera 104. In some embodiments, unique depth regions of interest are segmented based on world coordinate contours. In one such approach, a contour is a region with a consistently ascending or descending slope and with less than 5 mm variation in slope over a 1 cm×1 cm×1 cm kernel region (e.g. adaptive thresholding).

Figure 3:
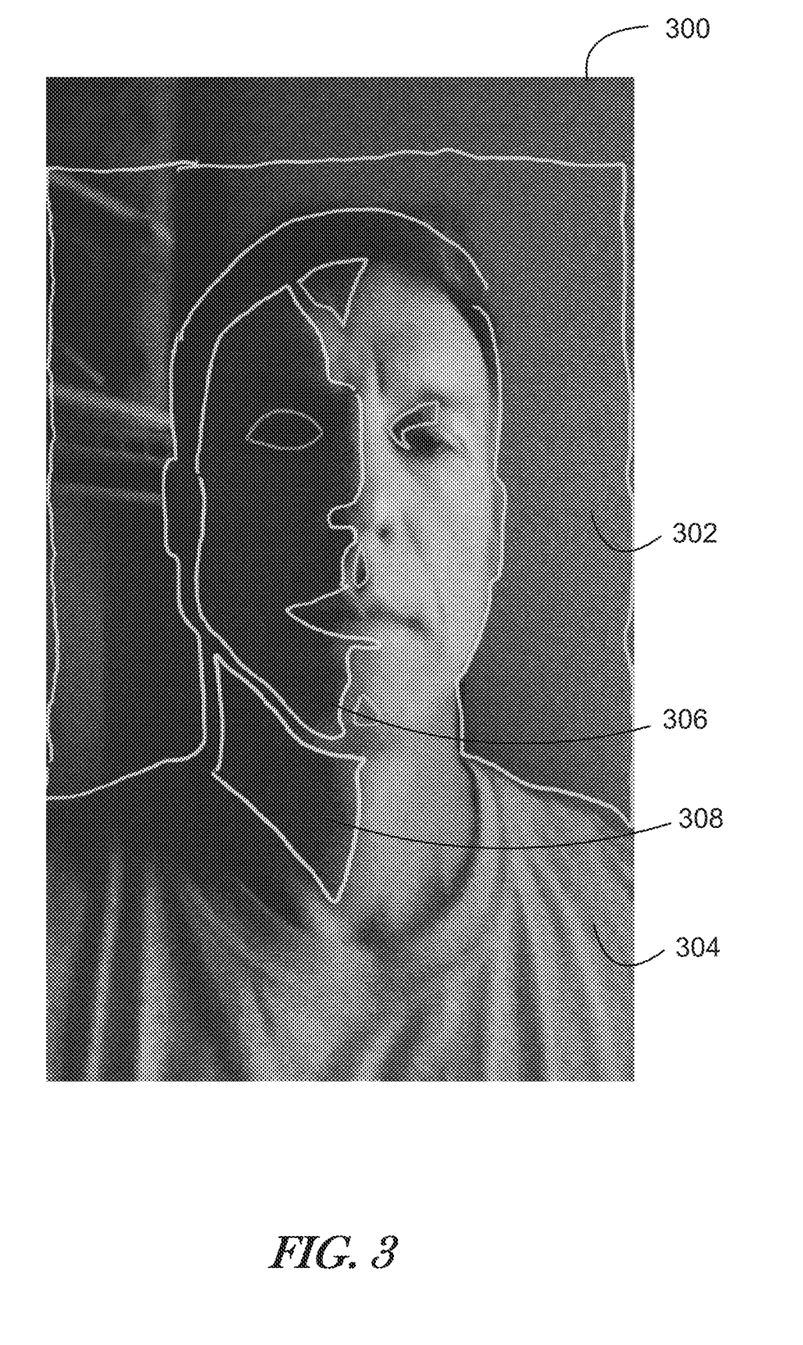
FIG. 3 illustrates an example of regions of interest.

In an embodiment, these regions of interest are projected at 220 on the 2D image (as shown, for example, in FIG. 3). In some such embodiments, an x,y pixel polygon descriptor is generated on the visible light image for each unique segmentation area projected on the 2D image. Brightness operations or other image compensation operations are applied to one or more of the regions of interest projected on the image scene at 225. In some embodiments, independent pixel integration times and amplification values are applied to each region of interest projected on the image scene at 225. In an embodiment, for example, operations are performed on each region of interest as necessary to achieve a region-specific pixel brightness of 128 in the hue saturation brightness (HSB) space. The corrected image is then be used for face detection at 230.

The polygon-based image compensation can be in the hardware/firmware of the image capture device (e.g., camera 104 or 106) or in software and implemented after image capture on a general CPU. Thus, in various embodiments, the functionality described above is implemented in software on a host computer or as hardware or firmware within 3D camera 104.

In some embodiments, camera 104 includes HW/FW features which isolate all regions of interest in the camera scene that require independent gain/exposure control using a depth surface analysis. In some such embodiments, this is performed prior to searching for a face in the scene. By doing so, a single corrected camera image can provide an enhanced face image to the face recognizer and face identifier in those lighting conditions. This allows for cameras 104 and 106 to find poorly lit faces under a broader range of real world conditions.

This functionality may be incorporated in any camera employing depth technology. Example uses include, but are not limited to, facial recognition, ease-of-access, rich video conferencing, and content creation.

An example of regions of interest is shown in FIG. 3. In an image 300, region 302 illustrates a background. Region 302 illustrates areas that do not need image compensation, while regions 306 and 308 illustrate the regions the method described in FIG. 2 is directed to. As noted above, regions 306 and 308 are identified, for example, as a function of changes in slope.

Figure 4:
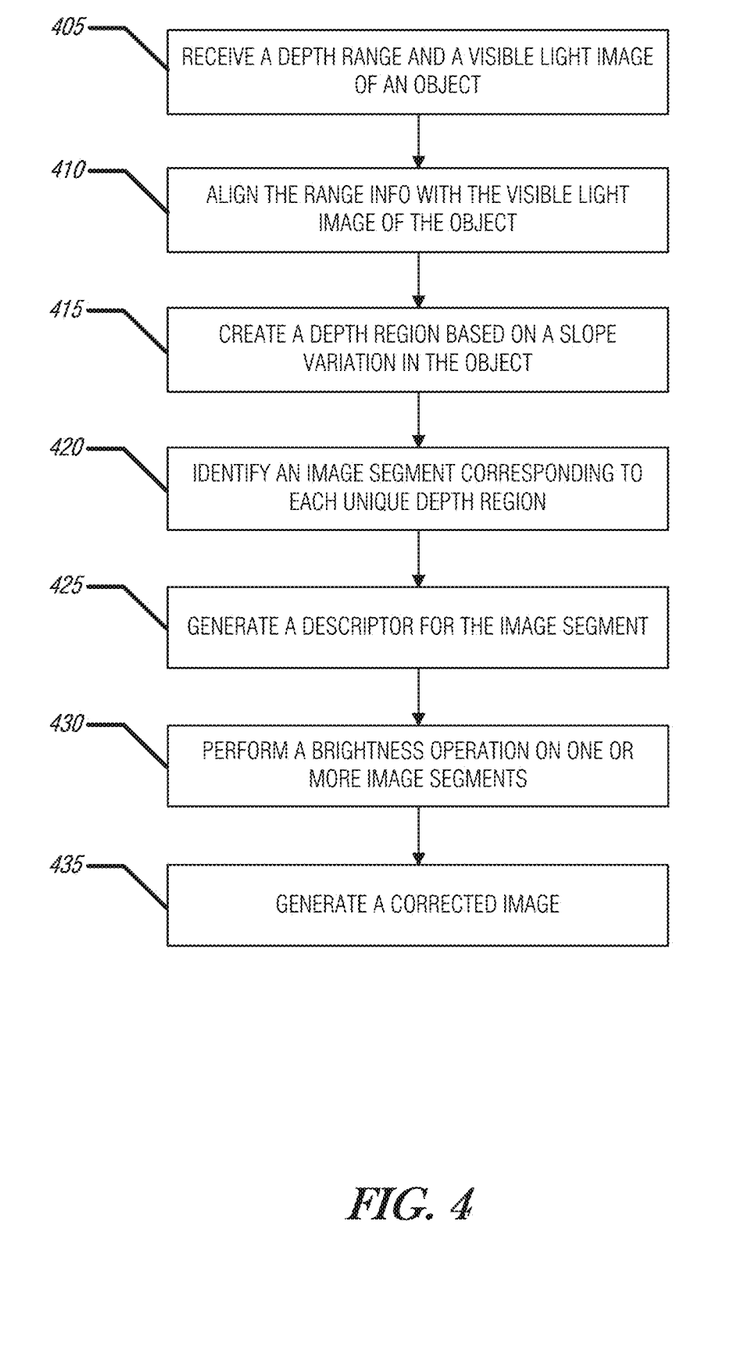
FIG. 4 illustrates a method for generating a corrected image.

FIG. 4 is a flow diagram illustrating a method for generating a corrected image, according to an embodiment. At 405, an image of an object is acquired from an imaging device. The imaging device may include a visible light sensor and a depth sensor. In various embodiments, the imaging device may be include one or more depth sensing 3D technologies (e.g. multiple cameras (IR or visible), structured light, time of flight, etc.). A depth range and a visible light image are received at 405.

At 410, the depth range information is aligned with the visible light image of the object. In an example embodiment, the depth range information may be converted to a coordinate system. Coordinates of the depth range information may be matched to the coordinates of the visible light image so the depth range matches the corresponding area of the visible light image. In another embodiment, the depth range information is used to generate a three-dimensional image and the three-dimensional image is projected on the visible light image.

At 415, a depth region is created based on a slope variation in the object as measured by the depth range information. The depth region describes an area that may be considered similarly affected by light variation throughout the depth region. In an embodiment, each unique depth region is created based on world coordinate contours by detecting regions of the 3D image that have contours having a consistently ascending or descending slope. In one such embodiment, these depth regions are limited to contours having a slope variation of less than 5 mm of the slope over a 1 cm×1 cm×1 cm kernel region (e.g. adaptive thresholding).

At 420, an image segment corresponding to each unique depth region is identified on the visible light image. In an embodiment, the depth regions are transferred to the aligned visible light image for individual processing to allow each segment to be processed independent of the rest of the visible light image. In an embodiment, each unique depth region created using world coordinates is projected on the visible light image.

At 425, a descriptor is generated for each image segment. The descriptor is a unique identifier for an area of the visible light image that should be processed uniformly as the area is considered to be similarly affected by light variations in the visible light image. A unique descriptor is issued for each image segment of an image so that each segment may be processed independent from the other image segments and the visible light image as a whole. In an embodiment, the descriptor is an x,y pixel polygon descriptor.

At 430, a brightness operation is performed on one or more image segments. In an embodiment, the brightness operation brightens dim image segments and darkens washed out image segments to bring the segments to a uniform brightness. In an embodiment, independent pixel integration times and amplification values are applied to selected image segments to achieve a pixel brightness of 128 in the HSB space for each selected image segment.

At 435, a corrected image is generated. The corrected image includes the brightness adjustment for selected image segments, providing a more useable image (e.g. one that can be passed to another application, stored for later use, displayed to a user, etc.). In an embodiment, the corrected image includes is used for face detection and authentication.

What has been defined is a system of regional exposure control that relies on segmentation of the image to correct sections of the image. The image can then be used for facial recognition and authentication. Depth information is used to define exposer gain regions and to recognize image segments requiring correction in the image. In some embodiments, a rich polygon-based region of interest descriptor is used to define complex shapes and to reduce the problem of image blurring from user movement while seeking the optimal sensor settings.

In an embodiment, definition and labeling of regions of interest occurs in 3D camera 104. In some such embodiments, a processor in 3D camera 104 determines the corrections as well.

Hardware Platform

Embodiments may be implemented in one or a combination of hardware, firmware, and software. In an embodiment, a camera attached to a computer captures both 3D range information and 2D image data and processes the image within the camera in one of the manners described above before providing the image to the computer for face detection and authentication. In another embodiment, a camera attached to a computer captures both 3D range information and 2D image data and transmits the 3D range information and 2D image data to the computer for processing in one of the manners described above before the improved image is used by the computer for face detection and authentication. In some embodiments, the 3D camera uses structured light to capture the 3D range information.

Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times.

Software can accordingly configure a hardware processor, for example, to constitute a particular module at one instance of time and to constitute a different module at a different instance of time.

Figure 5:
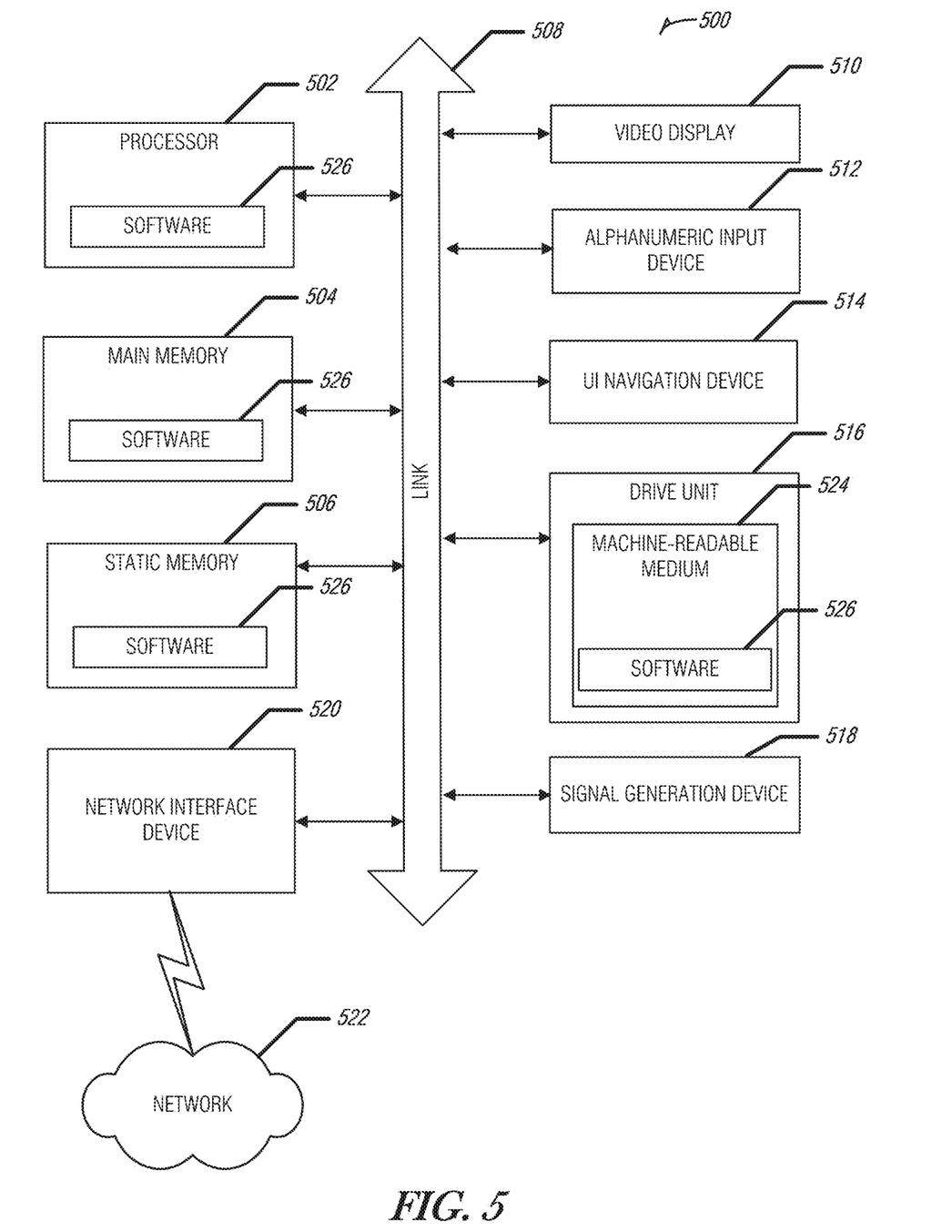
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include, or may operate by, logic or a number of components, or mechanisms. Circuit-sets are a collection of circuits implemented in tangible entities that include hardware (e.g., simple circuits, gates, logic, etc.). Circuit-set membership may be flexible over time and underlying hardware variability. Circuit-sets include members that may, alone or in combination, perform specified operations when operating. In an example, hardware of the circuit-set may be immutably designed to carry out a specific operation (e.g., hardwired). In an example, the hardware of the circuit-set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit-set in hardware via the variable connections to carry out portions of the specific operation when in operation. Accordingly, the computer readable medium is communicatively coupled to the other components of the circuit-set member when the device is operating. In an example, any of the physical components may be used in more than one member of more than one circuit-set. For example, under operation, execution units may be used in a first circuit of a first circuit-set at one point in time and reused by a second circuit in the first circuit-set, or by a third circuit in a second circuit-set at a different time.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In an embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) for enhanced image correction comprising: a 2D camera; a 3D camera; and a processor to: receive a two-dimensional image from the 2D camera; receive range information from the 3D camera; align the range information with the two-dimensional image; identify one or more depth regions; select, within the two-dimensional image, image segments corresponding to the one or more depth regions; perform brightness operations on one or more of the image segments to form a corrected image; and authenticate a user based on a user feature in the corrected image.

In Example 2, the subject matter of Example 1 may include, wherein the two-dimensional image is a video frame.

In Example 3, the subject matter of any one of Examples 1 to 2 may include, wherein to select image segments, the processor is to generate a pixel polygon descriptor for each image segment.

In Example 4, the subject matter of any one of Examples 1 to 3 may include, wherein to align the range information with the two-dimensional image, the processor is to convert the range information to a coordinate system.

In Example 5, the subject matter of any one of Examples 1 to 4 may include, wherein the range information is segmented based on world coordinate contours.

In Example 6, the subject matter of any one of Examples 1 to 5 may include, wherein to select the image segment, the processor is to project the depth region on the two-dimensional image.

In Example 7, the subject matter of any one of Examples 1 to 6 may include, wherein the processor is to determine, for each selected image segment, a desired pixel brightness in the hue saturation brightness space and modifies 2D camera controls as necessary to achieve the desired pixel brightness in the hue saturation brightness space.

In Example 8, the subject matter of any one of Examples 1 to 7 may include, wherein the desired pixel brightness is approximately 128.

In Example 9, the subject matter of any one of Examples 1 to 8 may include, wherein the processor is to modify 2D camera controls to apply to each selected image segment, independent pixel integration times based on the desired pixel brightness.

In Example 10, the subject matter of any one of Examples 1 to 9 may include, wherein the processor is to modify 2D camera controls to apply to each selected image segment, amplification values based on the desired pixel brightness.

In Example 11, the subject matter of any one of Examples 1 to 10 may include, wherein the processor is to search for a user's feature in the corrected image and authenticates the user based on the user feature.

In Example 12, the subject matter of any one of Examples 1 to 11 may include, wherein the processor is to search for a face in the corrected image and authenticates a user based on facial features in the image.

In Example 13, the subject matter of any one of Examples 1 to 12 may include, wherein the processor is to authenticate a user by executing a cloud-based authentication routine.

In Example 14, the subject matter of any one of Examples 1 to 13 may include, wherein the processor determines, for each selected image segment, a desired pixel brightness in the hue saturation brightness space and applies independent pixel integration times and amplification values as necessary to achieve the desired pixel brightness in the hue saturation brightness space.

In Example 15, the subject matter of any one of Examples 1 to 14 may include, wherein the desired pixel brightness is approximately 128.

In Example 16, the subject matter of any one of Examples 1 to 15 may include, wherein the processor is to search for a user's feature in the corrected image and authenticate the user based on the user feature.

In Example 17, the subject matter of any one of Examples 1 to 16 may include, wherein the processor is to search for a face in the corrected image and authenticate a user based on facial features in the image.

In Example 18, the subject matter of any one of Examples 1 to 17 may include, wherein to authenticate the user, the processor is to execute a cloud-based authentication routine.

In Example 19, the subject matter of any one of Examples 1 to 18 may include, wherein to select, within the two-dimensional image, image segments corresponding to the one or more depth regions, the processor is to identify contours in the image.

In Example 20, the subject matter of any one of Examples 1 to 19 may include, wherein a contour is a consistently ascending or descending slope with less than a threshold level of variation in slope over a predefined kernel region.

In Example 21, the subject matter of any one of Examples 1 to 20 may include, wherein a contour is a consistently ascending or descending slope with less than 5 mm variation in slope over a 1 cm×1 cm×1 cm kernel region.

In Example 22, the subject matter of any one of Examples 1 to 21 may include, wherein to perform the brightness operation, the processor is to distribute the brightness operation for each image segment to a separate processor.

In Example 23, the subject matter of any one of Examples 1 to 22 may include, wherein the 2D and 3D cameras are separate from the processor.

In Example 24, the subject matter of any one of Examples 1 to 23 may include, wherein the processor is in a computing device and wherein the 2D and 3D cameras are integrated into the computing device.

Example 25 includes subject matter (such as a method, means for performing acts, machine readable medium including instructions that when performed by a machine cause the machine to performs acts, or an apparatus to perform) for enhanced image correction comprising: obtaining a two-dimensional image of a scene; aligning range information obtained from the scene with the two-dimensional image; identifying one or more depth regions; selecting, within the two-dimensional image, image segments corresponding to the one or more depth regions; and performing brightness operations on one or more of the selected image segments to form a corrected image.

In Example 26, the subject matter of Example 25 may include, wherein aligning range information obtained from a scene with a two-dimensional image of the scene includes extracting the image from video.

In Example 27, the subject matter of any one of Examples 25 to 26 may include, wherein selecting image segments includes generating a pixel polygon descriptor for each image segment.

In Example 28, the subject matter of any one of Examples 25 to 27 may include, wherein aligning the range information with the two-dimensional image includes converting the range information to a coordinate system.

In Example 29, the subject matter of any one of Examples 25 to 28 may include, wherein aligning the range information with the two-dimensional image includes segmenting the range information based on world coordinate contours.

In Example 30, the subject matter of any one of Examples 25 to 29 may include, wherein selecting image segments includes projecting the depth region on the two-dimensional image.

In Example 31, the subject matter of any one of Examples 25 to 30 may include, wherein performing the brightness operation comprises: determining, for each selected image segment, a desired pixel brightness in the hue saturation brightness space; and modifying 2D camera controls as necessary to achieve the desired pixel brightness in the hue saturation brightness space.

In Example 32, the subject matter of any one of Examples 25 to 31 may include, wherein the desired pixel brightness is approximately 128.

In Example 33, the subject matter of any one of Examples 25 to 32 may include, wherein modifying 2D camera controls includes applying to each selected image segment, independent pixel integration times based on the desired pixel brightness.

In Example 34, the subject matter of any one of Examples 25 to 33 may include, wherein modifying 2D camera controls includes applying to each selected image segment, amplification values based on the desired pixel brightness.

In Example 35, the subject matter of any one of Examples 25 to 34 may include, wherein the method further comprises searching for a user's feature in the corrected image and authenticating the user based on the user feature.

In Example 36, the subject matter of any one of Examples 25 to 35 may include, wherein the method further comprises searching for a face in the corrected image and authenticating a user based on facial features in the image.

In Example 37, the subject matter of any one of Examples 25 to 36 may include, wherein authenticating the user includes executing a cloud-based authentication routine.

In Example 38, the subject matter of any one of Examples 25 to 37 may include, wherein performing the brightness operation comprises: determining, for each selected image segment, a desired pixel brightness in the hue saturation brightness space; and applying independent pixel integration times and amplification values as necessary to achieve the desired pixel brightness in the hue saturation brightness space.

In Example 39, the subject matter of any one of Examples 25 to 38 may include, wherein the desired pixel brightness is approximately 128.

In Example 40, the subject matter of any one of Examples 25 to 39 may include, wherein the method further comprises searching for a user's feature in the corrected image and authenticating the user based on the user feature.

In Example 41, the subject matter of any one of Examples 25 to 40 may include, wherein the method further comprises searching for a face in the corrected image and authenticating a user based on facial features in the image.

In Example 42, the subject matter of any one of Examples 25 to 41 may include, wherein authenticating includes executing a cloud-based authentication routine.

In Example 43, the subject matter of any one of Examples 25 to 42 may include, wherein selecting, within the two-dimensional image, image segments corresponding to the one or more depth regions includes identifying contours in the image.

In Example 44, the subject matter of any one of Examples 25 to 43 may include, wherein a contour is a consistently ascending or descending slope with less than a threshold level of variation in slope over a predefined kernel region.

In Example 45, the subject matter of any one of Examples 25 to 44 may include, wherein a contour is a consistently ascending or descending slope with less than 5 mm variation in slope over a 1 cm×1 cm×1 cm kernel region.

In Example 46, the subject matter of any one of Examples 25 to 45 may include, wherein performing the brightness operation comprises distributing the brightness operation for each image segment to a separate processor.

Example 47 includes at least one machine-readable medium including instructions that, when performed by a machine, cause the machine to perform any of the Examples 25-46.

Example 48 includes an apparatus comprising means for performing any of the Examples 25-46.

Example 49 includes subject matter (such as a device, apparatus, or machine) for enhanced image correction comprising: a 2D camera; a 3D camera; means for receiving a two-dimensional image from the 2D camera; means for receiving range information from the 3D camera; means for aligning the range information with the two-dimensional image; means for identifying one or more depth regions; means for selecting, within the two-dimensional image, image segments corresponding to the one or more depth regions; means for performing brightness operations on one or more of the image segments to form a corrected image; and means for authenticating a user based on a user feature in the corrected image.

In Example 50, the subject matter of Example 49 may include, wherein the two-dimensional image is a video frame.

In Example 51, the subject matter of any one of Examples 49 to 50 may include, wherein the means for selecting image segments includes means for generating a pixel polygon descriptor for each image segment.

In Example 52, the subject matter of any one of Examples 49 to 51 may include, wherein the means for aligning the range information with the two-dimensional image includes means for converting the range information to a coordinate system.

In Example 53, the subject matter of any one of Examples 49 to 52 may include, wherein the range information is segmented based on world coordinate contours.

In Example 54, the subject matter of any one of Examples 49 to 53 may include, wherein the means for selecting the image segment includes means for projecting the depth region on the two-dimensional image.

In Example 55, the subject matter of any one of Examples 49 to 54 may include, wherein the apparatus includes a processor and wherein the processor determines, for each selected image segment, a desired pixel brightness in the hue saturation brightness space and modifies 2D camera controls as necessary to achieve the desired pixel brightness in the hue saturation brightness space.

In Example 56, the subject matter of any one of Examples 49 to 55 may include, wherein the desired pixel brightness is approximately 128.

In Example 57, the subject matter of any one of Examples 49 to 56 may include, wherein the processor modifies 2D camera controls to apply to each selected image segment, independent pixel integration times based on the desired pixel brightness.

In Example 58, the subject matter of any one of Examples 49 to 57 may include, wherein the processor modifies 2D camera controls to apply to each selected image segment, amplification values based on the desired pixel brightness.

In Example 59, the subject matter of any one of Examples 49 to 58 may include, wherein the processor searches for a user's feature in the corrected image and authenticates the user based on the user feature.

In Example 60, the subject matter of any one of Examples 49 to 59 may include, wherein the processor searches for a face in the corrected image and authenticates a user based on facial features in the image.

In Example 61, the subject matter of any one of Examples 49 to 60 may include, wherein the processor authenticates a user by executing a cloud-based authentication routine.

In Example 62, the subject matter of any one of Examples 49 to 61 may include, wherein the apparatus includes a processor and wherein the processor determines, for each selected image segment, a desired pixel brightness in the hue saturation brightness space and applies independent pixel integration times and amplification values as necessary to achieve the desired pixel brightness in the hue saturation brightness space.

In Example 63, the subject matter of any one of Examples 49 to 62 may include, wherein the desired pixel brightness is approximately 128.

In Example 64, the subject matter of any one of Examples 49 to 63 may include, wherein the apparatus further comprises means for searching for a user's feature in the corrected image and means for authenticating the user based on the user feature.

In Example 65, the subject matter of any one of Examples 49 to 64 may include, wherein the apparatus further comprises means for searching for a face in the corrected image and means for authenticating a user based on facial features in the image.

In Example 66, the subject matter of any one of Examples 49 to 65 may include, wherein the means for authenticating includes means for executing a cloud-based authentication routine.

In Example 67, the subject matter of any one of Examples 49 to 66 may include, wherein the means for selecting, within the two-dimensional image, image segments corresponding to the one or more depth regions includes means for identifying contours in the image.

In Example 68, the subject matter of any one of Examples 49 to 67 may include, wherein a contour is a consistently ascending or descending slope with less than a threshold level of variation in slope over a predefined kernel region.

In Example 69, the subject matter of any one of Examples 49 to 68 may include, wherein a contour is a consistently ascending or descending slope with less than 5 mm variation in slope over a 1 cm×1 cm×1 cm kernel region.

In Example 70, the subject matter of any one of Examples 49 to 69 may include, wherein the means for performing the brightness operation comprises means for distributing the brightness operation for each image segment to a separate processor.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for enhanced image correction, comprising:
a 2D camera;
a 3D camera; and
a processor to:
receive a two-dimensional image from the 2D camera, wherein the two-dimensional image is not homogeneously illuminated and wherein the two-dimensional image has a first coordinate system;
receive range information from the 3D camera, wherein the range information has a second coordinate system;
identify one or more depth regions from range information based on:
determine contours within the range information that are ascending or descending; and
select regions from the range information that have either an ascending contour or a descending contour and a slope variation over a predefined kernel region of the range information that is within a threshold level;
align the range information with the two-dimensional image by aligning the first coordinate system and the second coordinate system to a world coordinate system;

select, within the two-dimensional image, image segments corresponding to world coordinates of the one or more depth regions;

perform brightness operations on one or more of the image segments to form a corrected image with region-specific pixel brightness for each of the one or more image segments; and authenticate a user based on a user feature in the corrected image.

2. The system of claim 1, wherein the two-dimensional image is a video frame.

3. The system of claim 1, wherein to select image segments, the processor is to generate a pixel polygon descriptor for each image segment.

4. The system of claim 1, wherein to select the image segment, the processor is to project the depth region on the two-dimensional image.

5. The system of claim 1, wherein the processor is to determine, for each selected image segment, a desired pixel brightness in the hue saturation brightness space and modifies 2D camera controls as necessary to achieve the desired pixel brightness in the hue saturation brightness space.

6. The system of claim 5, wherein the desired pixel brightness is approximately 128.

7. The system of claim 5, wherein the processor is to modify 2D camera controls to apply to each selected image segment, independent pixel integration times based on the desired pixel brightness.

8. The system of claim 5, wherein the processor is to modify 2D camera controls to apply to each selected image segment, amplification values based on the desired pixel brightness.

9. The system of claim 5, wherein the processor is to search for a user's feature in the corrected image and authenticates the user based on the user feature.

10. The system of claim 5, wherein the processor is to search for a face in the corrected image and authenticates a user based on facial features in the image.

11. The system of claim 10, wherein the processor is to authenticate a user by executing a cloud-based authentication routine.

12. A method of enhanced image correction, comprising:
obtaining a two-dimensional image of a scene, wherein the two-dimensional image is not homogeneously illuminated and wherein the two-dimensional image has a first coordinate system;
obtaining range information of the scene, wherein the range information has a second coordinate system;
identifying one or more depth regions from the range information based on:
determining contours within the range information that are ascending or descending; and
selecting regions from the range information that have either an ascending contour or a descending contour and a slope variation over a predefined kernel region of the range information that is within a threshold level;
aligning the range information with the two-dimensional image by aligning the first coordinate system and the second coordinate system to a world coordinate system;
selecting, within the two-dimensional image, image segments corresponding to world coordinates of the one or more depth regions; and
performing brightness operations on one or more of the selected image segments to form a corrected image with region-specific pixel brightness for each of the one or more image segments.

13. The method of claim 12, wherein obtaining range information from the scene with a two-dimensional image of the scene includes extracting the image from video.

14. The method of claim 12, wherein selecting image segments includes generating a pixel polygon descriptor for each image segment.

15. The method of claim 12, wherein performing the brightness operation comprises:
determining, for each selected image segment, a desired pixel brightness in the hue saturation brightness space; and
applying independent pixel integration times and amplification values as necessary to achieve the desired pixel brightness in the hue saturation brightness space.

16. The method of claim 15, wherein the desired pixel brightness is approximately 128.

17. The method of claim 15, wherein the method further comprises searching for a user's feature in the corrected image and authenticating the user based on the user feature.

18. The method of claim 15, wherein the method further comprises searching for a face in the corrected image and authenticating a user based on facial features in the image.

19. At least one non-transitory machine-readable medium including instructions that, when performed by a machine, cause the machine to:
obtain a two-dimensional image of a scene, wherein the two-dimensional image is not homogeneously illuminated and wherein the two-dimensional image has a first coordinate system;
obtain range information of the scene, wherein the range information has a second coordinate system;
identify one or more depth regions from the range information based on:
determine contours within the range information that are ascending or descending; and
select regions from the range information that have either an ascending contour or a descending contour and a slope variation over a predefined kernel region of the range information that is within a threshold level;
align the range information with the two-dimensional image by aligning the first coordinate system and the second coordinate system to a world coordinate system;
select, within the two-dimensional image, image segments corresponding to world coordinates of the one or more depth regions; and
perform brightness operations on one or more of the selected image segments to form a corrected image with region-specific pixel brightness for each of the one or more image segments.

20. The at least one non-transitory machine-readable medium of claim 19, wherein each contour has a consistently ascending or descending slope with less than 5 mm variation in slope over a 1 cm by 1 cm by 1 cm kernel region.

21. The at least one non-transitory machine-readable medium of claim 19, wherein the instructions to perform the brightness operation include instructions to distribute the brightness operation for each image segment to a separate processor.

22. The system of claim 1, wherein each contour has a consistently ascending or descending slope with less than 5 mm variation in slope over a 1 cm by 1 cm by 1 cm kernel region.

23. The method of claim 12, wherein each contour has a consistently ascending or descending slope with less than 5 mm variation in slope over a 1 cm by 1 cm by 1 cm kernel region.

* * * * *

UNITED STATES PATENT AND TRADEMARK OFFICE
CERTIFICATE OF CORRECTION

Page 1 of 1

PATENT NO. : 10,764,563 B2
APPLICATION NO. : 14/664475
DATED : September 1, 2020
INVENTOR(S) : Graumann et al.

It is certified that error appears in the above-identified patent and that said Letters Patent is hereby corrected as shown below:

In the Claims

In Column 12, Line 55, in Claim 1, after "from", insert --the--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*